(12) United States Patent
Kohler et al.

(10) Patent No.: US 8,913,736 B2
(45) Date of Patent: Dec. 16, 2014

(54) SYSTEM AND METHOD FOR DELIVERING A CONTACT TO A PREFERRED AGENT AFTER A SET WAIT PERIOD

(75) Inventors: Joylee E. Kohler, Northglenn, CO (US); Dhaval Desai, Pune (IN); Luciano Godoy Fagundes, Sao Paulo (BR); Mohammad Khan, Pune (IN); Tommy Moran, Galway (IE); Veeranna Angadageri Yamanappa, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 269 days.

(21) Appl. No.: 13/204,366

(22) Filed: Aug. 5, 2011

(65) Prior Publication Data
US 2012/0183131 A1 Jul. 19, 2012

Related U.S. Application Data

(60) Provisional application No. 61/433,848, filed on Jan. 18, 2011.

(51) Int. Cl.
*H04M 3/00* (2006.01)
*H04M 5/00* (2006.01)
*H04M 3/523* (2006.01)

(52) U.S. Cl.
CPC ............ *H04M 3/5238* (2013.01); *H04M 3/523* (2013.01)
USPC .................................. 379/265.11; 379/265.12

(58) Field of Classification Search
USPC ............. 379/265.01, 265.02, 265.11, 265.12, 379/265.13
See application file for complete search history.

(56) References Cited

U.S. PATENT DOCUMENTS

| | | | | |
|---|---|---|---|---|
| 6,661,889 | B1* | 12/2003 | Flockhart et al. | 379/265.05 |
| 6,847,714 | B2* | 1/2005 | Das et al. | 379/265.12 |
| 7,630,487 | B2* | 12/2009 | Shaffer et al. | 379/266.03 |
| 8,249,245 | B2* | 8/2012 | Jay et al. | 379/266.01 |
| 2006/0153356 | A1* | 7/2006 | Sisselman et al. | 379/265.12 |
| 2007/0274495 | A1* | 11/2007 | Youd et al. | 379/210.01 |
| 2009/0190749 | A1* | 7/2009 | Xie et al. | 379/266.01 |

\* cited by examiner

*Primary Examiner* — Nafiz E Hoque
(74) *Attorney, Agent, or Firm* — Maldjian Law Group LLC; John Maldjian; Alexander D. Walter

(57) ABSTRACT

A method for assigning a contact to undifferentiated agents is provided, comprising: describing substantially each undifferentiated agent using at least one agent attribute to produce a set of agent attribute values; describing a contact using at least one contact attribute to produce a set of contact attribute values; relating the sets of agent and contact attribute values to produce at least one preferred agent; determining an expected wait time for substantially each of the at least one preferred agent to produce a set of expected wait times; determining a wait tolerance for the contact; if the expected wait time for at least one preferred agent is less than the wait tolerance, then assign the contact to the at least one preferred agent; and if the expected wait time for the at least one preferred agent is greater than the wait tolerance, then assign the contact to an undifferentiated agent.

22 Claims, 5 Drawing Sheets

SYSTEM AND METHOD FOR DELIVERING A CONTACT TO A PREFERRED AGENT AFTER A SET WAIT PERIOD

CROSS-REFERENCE TO RELATED APPLICATIONS

This application claims the benefit of U.S. Provisional Patent Application Ser. No. 61/433,848, filed on Jan. 18, 2011, the content of which is hereby incorporated by reference in its entirety.

BACKGROUND

1. Field of the Invention

Embodiments of the present invention generally relate to contact center resource management. More specifically, embodiments of the present invention relate to a system and method for delivering a contact to a preferred agent, where that preferred agent may not be initially available and the contact may be placed in a queue for a tolerable set wait period.

2. Description of the Related Art

To achieve customer satisfaction, a contact center attempts to provide the appropriate agent to a contact (a.k.a. customer) so the agent may best assist the contact with his or her specific needs. That is, a contact center will commonly assign a particular agent to a contact based on a set of parameters such as attributes from a work assignment engine, and/or particular skills of the agent, and/or any other means. The agent, who has been matched to the contact based upon these parameters, is then commonly referred to as the "preferred" agent for that particular contact at that particular time.

This matching of a preferred agent with a contact is often achieved by "delivering" the contact to the agent after the agent has been matched. For example, certain agents with certain work assignments or skill sets that match the contact when that contact makes a request for assistance from an agent are routed to the appropriate contact by way of, for example, an assignment engine. Existing contact center systems and methods are capable of providing preferred agents to a perspective contact based upon a match of the agent. However, if a preferred agent is not available for a particular contact making a request, the contact is almost immediately or inevitably routed to a non-preferred agent to avoid a perceived unacceptable idle or wait time. As a result, the contact is routed to an agent that may not be the best match for that contact at that particular time with that contact's particular issue. Customer satisfaction, although intended to be met or exceeded by avoiding any wait time, may actually be compromised or not rise to the level of satisfaction so desired or required by the contact center.

Similarly, if a preferred agent has completed his or her job with a contact and the next contact is not waiting to be picked up by the preferred or matched agent, the agent is commonly, almost immediately assigned to a non-preferred contact and another opportunity for customer satisfaction escapes the contact center.

Known systems for matching contact with preferred agents and vice versa include Avaya's CC Elite 6.0. This system includes the concept of preferred agents based on skill level, but there is no feature in this system that allows for a set wait period for a preferred agent even if one will be available shortly. Similarly, there is no way for an agent who has become available, and may be a candidate as a preferred agent for a particular contact, to wait for preferred work.

Historically, overflow groups have set up separate queues for preferred and non-preferred agents with vectors waiting a fixed amount of time before queuing to the non-preferred queue. There is no known ability, however, for a contact to wait for a better (preferred) agent when a non-preferred agent is available. Similarly, there is no known way for an available agent to wait for a better (preferred) contact when a non-preferred contact is waiting—the theory being the less the expected wait time, the better, no matter what the end result.

Thus, there is a need for a system and method that provides a means to allow a contact, albeit after waiting some amount of time or period, to be delivered to a preferred agent before that contact is routed to a non-preferred agent or before an agent, who has become available, is routed to a non-preferred contact.

SUMMARY

Embodiments of the present invention relate to a system and method for delivering a contact to a preferred agent after a set wait period tolerable by the contact.

In one embodiment of the present invention, there is provided a method to assign a contact to one of a set of undifferentiated agents, comprising: describing substantially each undifferentiated agent by use of at least one agent attribute to produce a set of agent attribute values; describing a contact by use of at least one contact attribute to produce a set of contact attribute values; relating the set of agent attribute values to the set of contact attribute values to produce at least one preferred agent; determining an expected wait time for substantially each of the at least one preferred agent, to produce an expected wait time for a next preferred agent to become available; determining a wait tolerance for the contact; if the expected wait time for the next preferred agent to become available is less than the wait tolerance, then assign the contact to the at least one preferred agent; and if the expected wait time for the at least one preferred agent is not less than the wait tolerance, then assign the contact to an undifferentiated agent.

In another embodiment of the present invention, there is provided a system to assign a contact to one of a set of undifferentiated agents, comprising: a processor; a memory coupled to the processor, the memory configured to store software that, when executed by the processor, performs the steps of: describing substantially each undifferentiated agent by use of one or more agent attributes, to produce a set of agent attribute values; describing a contact by use of at least one contact attribute to produce a set of contact attribute values; relating the set of agent attribute values to the set of contact attribute values to produce one or more preferred agents; determining an expected wait time for substantially each of the one or more preferred agents, to produce an expected wait time for a next preferred agent to become available; determining a wait tolerance for the contact; if the expected wait time for the next preferred agent to become available is less than the wait tolerance, then wait to assign the contact to the at least one preferred agent; and if the expected wait time for the at least one preferred agent is not less than the wait tolerance, then assign the contact to an undifferentiated agent.

In another embodiment of the present invention, there is provided a computer implemented system for delivering a contact to a preferred agent after a set wait period, the system including: a work assignment module configured to define what agent parameters to be used to describe a preferred agent, wherein the agent parameters comprise one or more of: a proficiency; a preferred language; a preferred location; a revenue potential; a first call resolution rate; an average quality score; and an average customer satisfaction score; an assignment module configured to evaluate the agent parameters for agents; a collection module configured to collect a first contact parameter from one of the contact and a routing point administration, wherein the first contact parameter comprise one or more of: a preferred language; a preferred location; a repeat contact; a purpose for contact; and a required proficiency; a database of historical data configured to store a second contact parameter, wherein the second contact parameter comprises one or more of: a revenue potential; a quality score; and a contact satisfaction score; a search module configured to search for a preferred agent, wherein a match between the agent parameters and at least one of the first contact parameter and the second contact parameter exceeds a predetermined threshold; a wait-determination module configured to determine, if no preferred agents are available, an expected wait period for a preferred agent to become available; a tolerance-determination module configured to determine a wait tolerance for the contact; a retrieval module configured to access a statistic of abandonment times in a contact history; a queue-maintenance module configured to determine an insertion point of the contact in a queue by use of one or more of the statistic of abandonment times and a service objective for the queue; a wait module configured to wait in the queue for a preferred agent if the wait tolerance is greater than the expected wait period, wherein the wait module is further configured to deliver the contact to a non-preferred agent if the wait tolerance is not greater than the expected wait period.

In one embodiment of the present invention, there is provided a method to assign a preferred contact to an agent, the method including: describing the agent by use of at least one agent attribute to produce a set of agent attribute values; describing a contact by use of at least one contact attribute to produce a set of contact attribute values; relating the set of agent attribute values to the set of contact attribute values to produce a match indicator; determining an idle time tolerance for the agent; and if the agent is idle, and if the expected idle time until the preferred customer arrives is less than or equal to the idle time tolerance for the agent, then wait for the preferred customer.

BRIEF DESCRIPTION OF THE DRAWING

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

Figure 1:
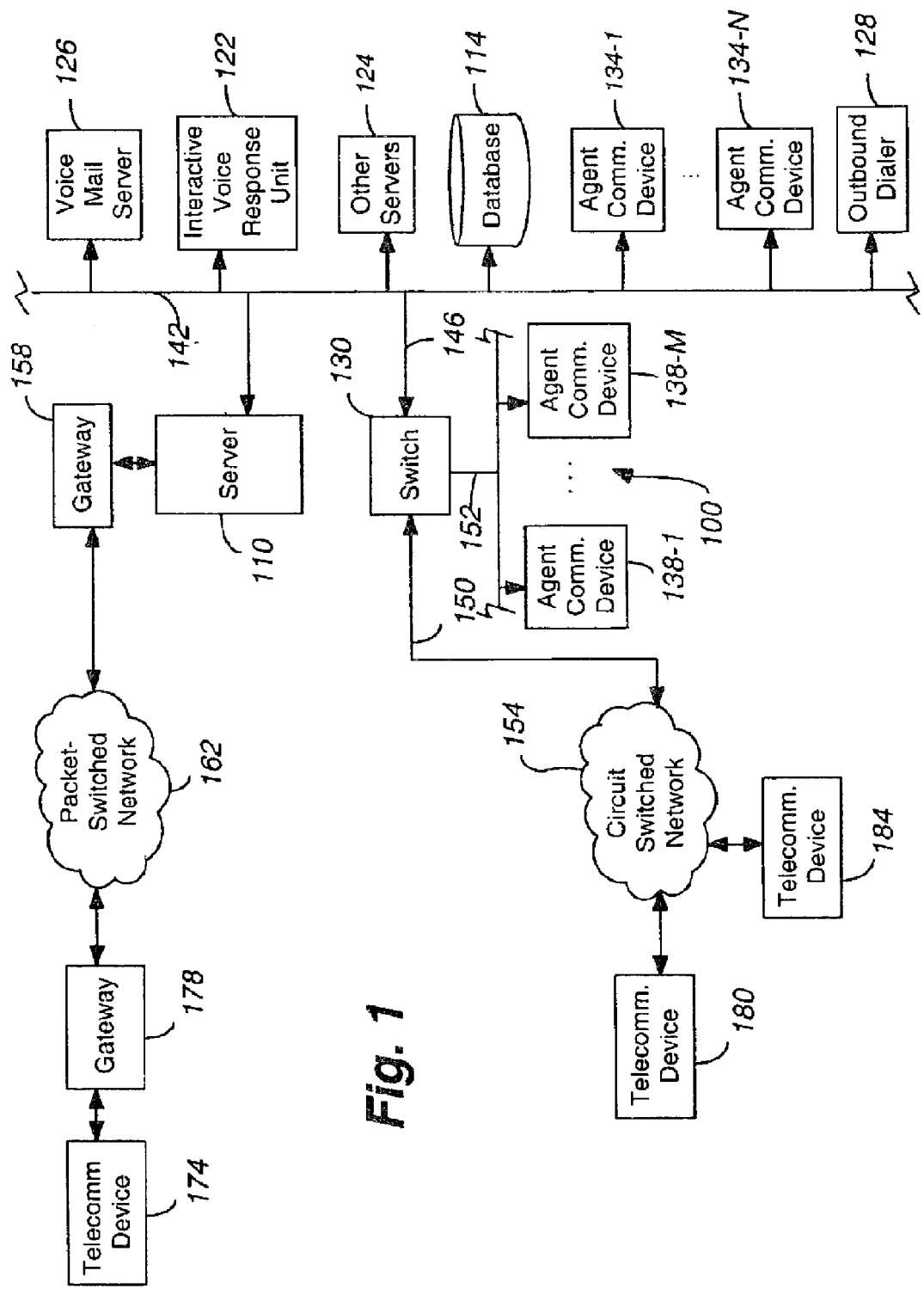
FIG. 1 is a block diagram depicting a contact center in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to a system and method for delivering a contact to a preferred agent after a set wait period. Other embodiments of the present invention generally relate to a system and method for an agent to wait for a preferred contact.

In one embodiment of the present invention, there is provided a method, comprising: defining what parameters or skills to be used to describe a preferred agent, such as, by way of example only, proficiency, preferred language, preferred location, revenue potential, first call resolution rate, average quality score, average contact satisfaction score, and the like; assigning (or using a lookup table in a database) these parameters for agents; collecting some of these parameters from the contact or from routing point administration—preferred language, preferred location, repeat contact, purpose for contact, proficiency required, and the like; looking up other attributes in contact history—revenue potential, quality score, customer satisfaction score, and the like; looking for agents that are preferred (agent's attribute value matches contact's attribute value for the same attribute); if no preferred agents are available, determining the expected wait period for the next preferred agent to become available; determining the wait tolerance for the contact; looking up average abandon time in contact history; using the abandon time for the queue (for example, maybe at the 90th percentile), i.e., enqueueing the customer contact in a queue position that is dependent upon the average abandon time; or using the service objective for the queue; and if the wait tolerance is greater than the expected wait time or period for the next preferred agent, then wait in queue for a preferred agent, otherwise deliver the contact to a non-preferred agent.

In another embodiment of the present invention, rather than delivering the contact to a non-preferred agent if the wait tolerance is less than the expected wait time for the next preferred agent, if no preferred agent is available, the method may comprise interrupting a preferred agent from his or her auxiliary work. Alternatively, the method may include multitasking a preferred agent who possesses the parameters and is capable of multi-tasking without substantially lowering contact satisfaction.

In another embodiment of the present invention, the method may comprise interacting with the contact and providing the contact with the expected wait time to speak with that contact's preferred agent; and letting the contact decide if he or she would like to wait for a preferred agent.

In another embodiment of the present invention, there is provided a computer implemented system for delivering a contact to a preferred agent after a set wait period. The system comprises: a work assignment engine for defining what parameters or skills to be used to describe a preferred agent, such as, by way of example only, proficiency, preferred language, preferred location, revenue potential, first call resolution rate, average quality score, average customer satisfaction score, and the like; an assignment engine for evaluating (or using a lookup table in a database) the parameters for agents; a means for collecting the parameters from the contact or from routing point administration, which may include preferred language, preferred location, repeat contact, purpose for contact, proficiency required, and the like; a database of historical data for looking up other attributes in the contact's history, for example, revenue potential, quality score, contact satisfaction score, and the like; means for looking for preferred agents (e.g., the agent's attribute value matches contact's attribute value for the same attribute); means for determining, if no preferred agents are available, the expected wait period for the next preferred agent to become available and determining the wait tolerance for the customer; means for accessing average abandon time in contact history; means for using the abandon time for the queue (for example, maybe at the 90th percentile) or using the service objective for the queue; and, means for, if the wait tolerance is greater than the expected, waiting for the next preferred agent, then waiting in queue for a preferred agent, otherwise delivering the contact to a non-preferred agent.

As used herein in connection with embodiments of the present invention, the term "contact" is defined as a customer or consumer of contact center resources, such as contact center agents or preferred agents. Although described in the context of a contact center, it is to be understood that this system and method is contemplated and within the scope of embodiments of this present invention to be applied to any system and method where agents are called upon to assist customers at any given time, where such agents are matched up to qualify as preferred agents for such contacts based upon a set of matching parameters. These parameters may be attributes generated by a work assignment engine or a skills-based system.

As used herein, the terms "engine" and/or "module" refer generally to a logical sequence or association of steps, processes or components. For example, a software engine or module may comprise a set of associated routines or subroutines within a computer program. Alternatively, an engine or a module may comprise a substantially self-contained hardware device. An engine or a module may also comprise a logical set of processes irrespective of any software or hardware implementation.

FIG. 1 depicts an illustrative embodiment of a contact center of the present invention where contact center agents may service preferred contacts, either singularly or in multiples, simultaneously or substantially simultaneously, after a tolerable wait period or by way of an interruption from auxiliary work. A contact center 100 comprises a central server 110 (described in more detail in connection with FIG. 2), a set of data stores or databases 114, which may or may not be contained within the central server 110, the databases 114 containing agent metrics, historical agent and contact data, other contact related information, and other information in general that can enhance the value and efficiency of the contact, and a plurality of servers, namely a voice mail server 126, an Interactive Voice Response (IVR) unit/system 122, and other servers 124, an outbound dialer 128, a switch 130, a plurality of working agents operating packet-switched (first) telecommunication devices 134-1 to N (such as computer work stations or personal computers or handheld communication devices including wireless communication devices), and/or circuit-switched (second) telecommunication devices 138-1 to M, all interconnected by a local area network LAN (or wide area network WAN) 142.

The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, and an email server) and the like. The switch 130 is connected, via a plurality of trunks 150, to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, and the like.

The server and/or switch can be a software-controlled system, including, but not limited to, a processing unit (CPU), microprocessor, or other type of digital data processor executing software or an Application-Specific Integrated Circuit (ASIC) as well as various portions or combinations of such elements.

Figure 2:
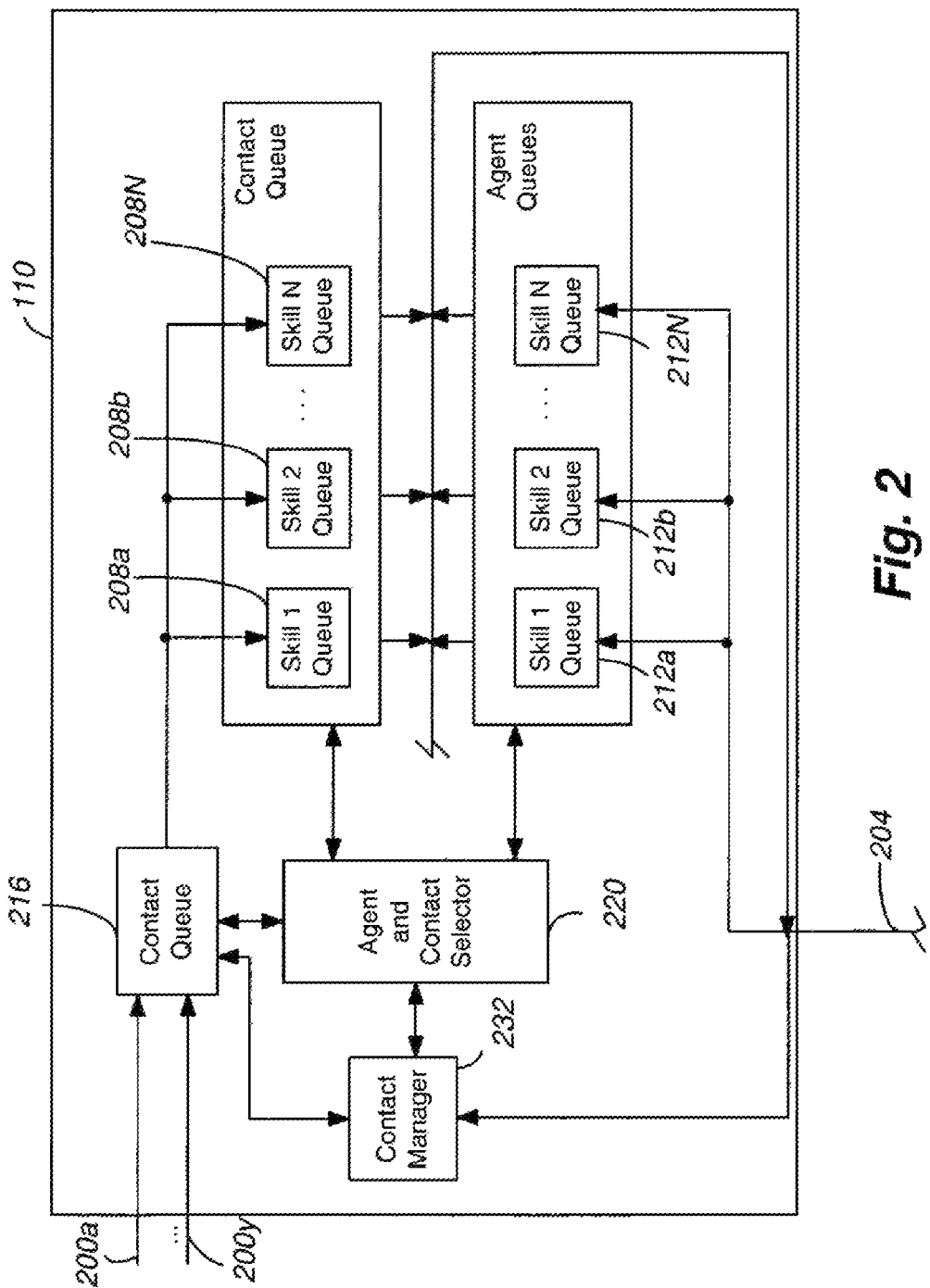
FIG. 2 is a block diagram depicting a server of the contact center of FIG. 1 in accordance with an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a Basic Call Management System (BCMS) (not shown) and a Call Management System (CMS) (not shown) that gathers call records and contact-center statistics for use in generating contact-center reports.

The switch 130 and/or server 110 can be any computer and/or telecommunication architecture for directing contacts to one or more telecommunication devices to be serviced by one or more preferred agents. Illustratively, the switch and/or server 110 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™; Communication Manager™, and/or S8300™ media server.

Typically, the switch/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and are either enqueued in individual ones of the contact queues 208a-n in their respective orders of priority or are enqueued in different ones of a plurality of contact queues that correspond to a different priority.

Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill. Each one of which corresponds to a different expertise level. Although depicted for clarity sake as skills of the agents, these queues equally may represent agent attributes or some other parameters such that the agents are matched up with contacts on a preferred agent basis.

In one embodiment of the present invention, as depicted in FIG. 2, a contact vector (queue) 216 is included among the control programs in the server 110. Contacts incoming to the contact center may be assigned by contact vector 216 to different contact queues 208a-n based upon a number of predetermined criteria, including customer identity, customer needs, contact center needs, current contact center queue lengths, customer value, and the agent skill, attributes or other parameters required for the proper handling of the contact and being designated as a preferred agent for a particular contact.

Agents who are determined to be preferred agents for a given contact, and are available for handling said contacts are assigned to agent queues 212a-n based upon the skills or attributes they possess. An agent may have multiple skills, attributes or other parameters, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3. Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be Avaya Inc.'s, G700 Media Gateway™, and may be implemented as hardware, such as via an adjunct processor (as shown) or as a chip in the server.

The first telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises directly serviced by the switch. More particularly, these extensions correspond to conventional telecommunication device endpoints serviced by the switch/server, and the switch/server can direct incoming contacts or calls to, and receive outgoing contacts or calls, from these extensions in a conventional manner. The second telecommunication devices can include, for example, wired and wireless telephones, PDAs, H.320 video phones and conferencing units, voice messaging and response units, and traditional computer telephony adjuncts.

It should be noted embodiments of the present invention do not require any particular type of information transport medium between switch or server and first and second telecommunication devices. That is, the present invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol (SIP) compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk. It should be understood the configuration of the switch, server, user telecommunication devices, and other elements as shown in FIG. 1 is for purposes of illustration only and should not be construed as limiting the present invention to any particular arrangement of elements.

As will be appreciated, the central server 110 is notified via LAN 142 of an incoming contact (e.g., a call) by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, and/or first or second telecommunication devices 134, 138 associated with a selected preferred agent.

The server 110 distributes and connects these contacts to telecommunication devices of available preferred agents based on the predetermined criteria noted above. When the central server 110 forwards a voice contact to a selected preferred agent, the central server 110 also forwards customer-related information from databases 114 to the selected preferred agent's computer work station for viewing (such as by a pop-up display) to permit the selected preferred agent to better serve the contact. The selected preferred agent will then process the contact(s) sent to him/her by the server 110.

According to embodiments of the present invention, included among the programs executing on the server 110 are a preferred agent and contact selector 220 and contact manager 232. The selector 220 and manager 232 are stored either in the main memory or in a peripheral memory (e.g., disk, CD ROM, etc.) or some other computer-readable medium of the center 100. The selector 220 and manager collectively effect an assignment between contacts in a queue and preferred agents serving the queue (either singularly or in multiple assignments) in a way that tends to maximize contact center efficiency.

Figure 3:
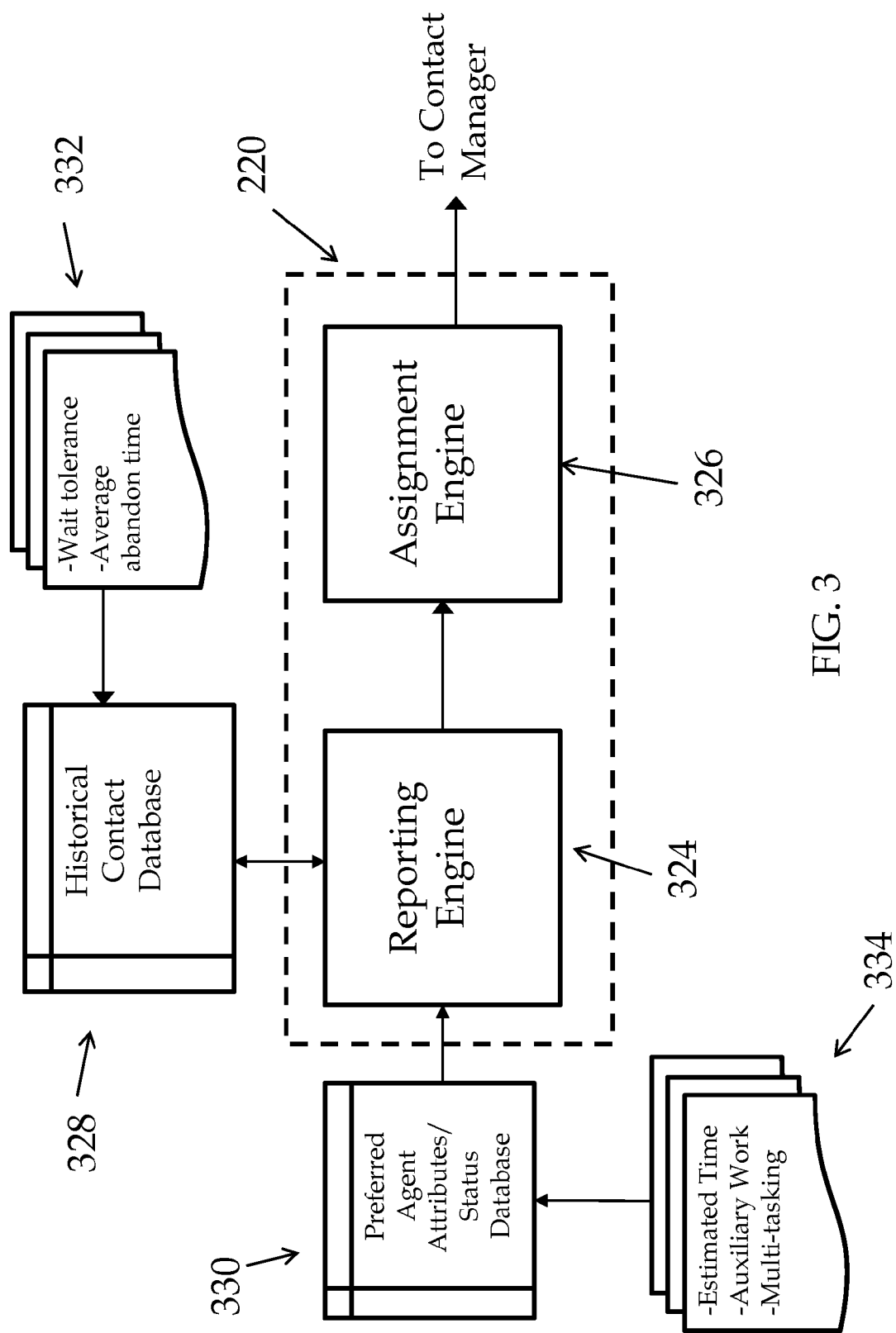
FIG. 3 is system block diagram of the server of FIG. 2, depicting a reporting engine and assignment engine in accordance with an embodiment of the present invention.

The selector 220 comprises a reporting engine 324 and assignment engine 326, see FIG. 3, which use predefined criteria in selecting a preferred agent to service the contact and whether one preferred agent is capable of being assigned to more than one contact at any given time.

In an embodiment of the present invention, the contact manager 232 receives assignment information from the selector 220, which selector has determined and identified, in addition to matching a preferred agent with a contact, dependant on skills, attributes or other parameters matched, the then current agent's availability, albeit not readily but within a tolerable wait period of the selected agent for singular or multiple contacts support, and provides instructions to the selector 220 to effect same.

The contact manager 232, based on one or more selected criteria, and agent match and availability or near availability, may determine which contacts will be assigned to the same preferred agent. One or more of the parameters can be used along or in any combination and include but are not limited to, average customer satisfaction score, average revenues, preferred language, preferred location, revenue potential, first call resolution rate, average quality score, and the like.

It is understood by embodiments of the present invention that a server, such as the one depicted in FIG. 2, may be connected to a computer network or system. A computer network includes the Internet, a global computer network, an internal computer network, dedicated server networks, and the like.

Referring to FIG. 3, which details a preferred agent and contact selector 220 of FIG. 2, there is provided within the selector 220 the reporting engine 324 and the assignment engine 326. The assignment engine 326 may also be referred to herein as a work assignment engine. Contact historical database 328 communicates with the reporting engine 324. In addition, a preferred agent attribute and status database 330 also communicates with the reporting engine 324.

The type of historical data stored internally in the historical contact database 328 includes, among other information, wait tolerances and average abandon time of the contact 332 and estimated time for preferred agent availability, preferred agent auxiliary work schedule and preferred agent's multi-tasking capabilities 334.

It is to be understood that, although embodiments of the present invention are described as gathering attributes or skills data as well as availability status data for one agent, these descriptions equally apply to more than one agent and in fact may apply to as many agents contained within a contact center or multiple contact centers at any given time. Similarly, although the historical contact database is referring to one contact's information, it is to be understood that the database 328 may contain historical information for one or more contacts. Furthermore, while embodiments of the present invention are described in connection with one contact center, it should be understood that it is within the scope of the present invention that these same systems and methods are scalable to be applied to agents at more than one contact center at any given time.

For example, although the description of the server 110, the agent and contact selector 220 and their respective sub-elements are discussed in the singular, it is understood that these elements 110 and 220 may represent multiple contact centers or each contact center may include one or more of these servers 110 and agent/contact selectors 220, or any combinations thereof. The system and method is described herein in the singular for purposes of clarity only.

In operation, referring to FIGS. 2 and 3, when contacts are received from the gateway 158 (FIG. 1) and queued on the communication lines 200*a-y*, the agent and contact selector 220 begins the selection process of matching preferred agents to contacts. This includes matching contact skill set or attribute requirements with agent skills or attributes. In addition, however, as contemplated by embodiments of the present invention, the agent and contact selector 220 performs an additional process of, after a preferred agent has been identified, if that preferred agent is not readily available for the contact to be delivered, determining the wait tolerance of the contact. That is, in one embodiment of the present invention, the reporting engine 324 performs the process of determining, from the historical contact database 328, the wait tolerance of the contact. This may be determined by checking the wait tolerance historical data along with the average abandon time for that particular contact, which contact has been matched up with a preferred but temporarily unavailable agent. The assignment engine 326 may then check the status of a preferred agent as to estimated time to being available or whether the agent is performing auxiliary work or whether the agent is a candidate for multi-tasking and can handle another contact 334.

If the wait tolerance determined by the reporting engine 324, given all the above parameters, is greater than the predicted wait for a preferred agent based upon the preferred agent's status, then the assignment engine 326 queues up the contact manager 232 to deliver the contact to a preferred agent. Significantly, the contact manager 232 sets the contact into a wait period with a predetermined timeout, based in part on the historical wait tolerance and average abandon time of the contact. Provided the set period does not timeout, the contact is delivered to a preferred agent.

Prior to making the decision to assign a preferred agent to a contact and deliver that contact to the preferred agent, the agent's skills and attribute data is stored in the database 330. Such data includes information that has been collected about the agent prior to the current session of assigning one or more contacts to the agent. That is, this data may be any and all information that has been previously collected and stored about the agent relating to the agent's parameters prior to the current session in which the agent is being assigned contacts. Therefore, this information can be sourced from months, weeks, or days ago, to as recently as information from a t-1 agent/contact session, i.e., the agent/contact session just prior to the current agent/contact session.

The assignment engine 326 then uses the agent data stored in database 330 to determine if the agent is preferred by the contact next queued by the agent and contact selector 220. Once the assignment engine 326 determines that at a given moment the agent is preferred, the assignment engine 326 will report same to the contact manager 232 to deliver a predetermined contact to that preferred agent.

Figure 4:
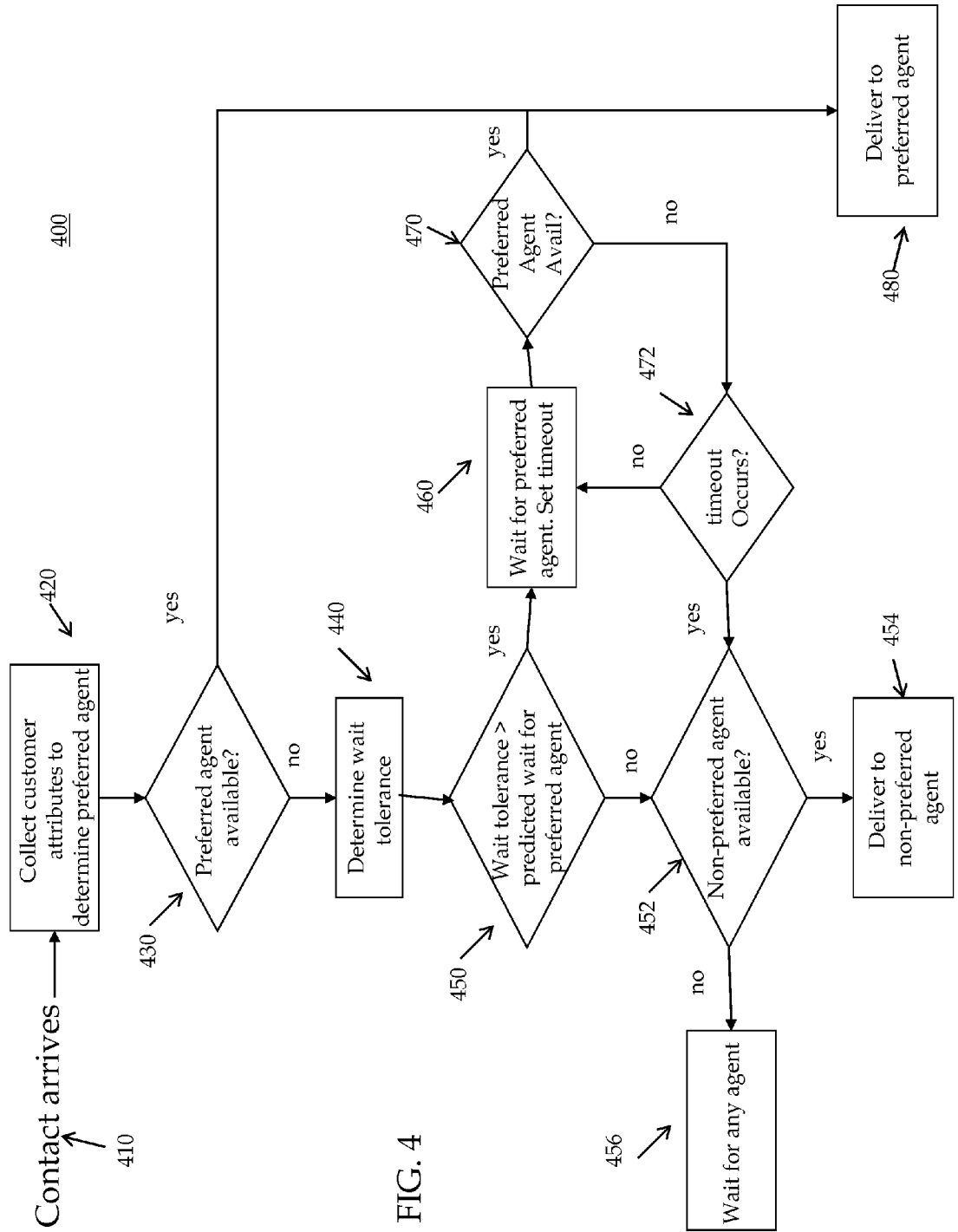
FIG. 4 is a flow chart depicting a flow for assigning preferred agents to contacts based upon availability after a tolerable wait time in accordance with another embodiment of the present invention.

In accordance with one embodiment of the present invention, utilizing the systems described in FIGS. 1-3, there is provided a method depicted in the flow diagram 400 of FIG. 4 for delivering contacts to preferred agents in a contact center. The method begins at step 410 where a contact arrives at the contact center 100. At step 420, the agent and contact selector 220 is collecting the customer attributes so the system 220 can begin to determine a preferred agent for the contact that has arrived at the contact center 100. At step 430, after the criteria for a preferred agent has been identified, the method queries whether any preferred agent is available. If a agent is not available, then at step 440, the method determines the wait tolerance of the contact. The wait tolerance of the contact may be found in the internal database 328 of the reporting engine 324. This is achieved by looking at average abandon time, or alternatively, using the abandon time for the queue (maybe at the 90th percentile or so). As another alternative, the system can determine wait tolerance by using the service objective for the queue.

At step 450, the method determines if the wait tolerance of the contact is greater than the predicted wait for a preferred agent. The predicted wait period for a preferred agent may be determined by a known "expected wait time" module. If the expected wait time is greater, then at step 460, the contact is put into a queue to wait for the preferred agent. At substantially the same time, the system sets a timeout value equal to the wait tolerance time or predicted wait time, whichever is less. At step 470, if a preferred agent becomes available before the timeout occurs, then at step 480, the contact is delivered to the preferred agent and the steps of this embodiment of the method ends.

Alternatively, if at step 450 the wait tolerance is not greater than the predicted wait period for a preferred agent, at step 452, the method determines if a non-preferred agent is available. If so, at step 454, the contact is delivered to the non-preferred agent. If, on the other hand, a non-preferred agent is not available at step 452, then the contact is queued to wait for any agent at step 456.

In another embodiment, if the set timeout occurs at step 472, then the method determines if a non-preferred agent is available at step 452. The steps then repeat as before. Alternatively, of course, if at step 430 a preferred agent is available at the time of inquiry, then the contact is delivered directly to a preferred agent at step 480 and the method promptly ends.

As another alternative, if at step 450 the wait tolerance is less than the predicted wait period for a preferred agent or at step 472 where a timeout occurs, rather than delivering a non-preferred agent, the method may interrupt a preferred agent from performing auxiliary work or the method may assign the contact to a preferred agent who is capable of handling multi-tasks, i.e., an agent already assigned to at least one other contact but one who, without much degradation of service, can handle another contact.

In yet another embodiment of the present invention, there is provided an option to speak to the contact and state, for example, "The expected wait time for our best agent (or for your preferred language) to the contact is . . . " and let the contact decide if he or she wants to wait for a preferred agent.

Figure 5:
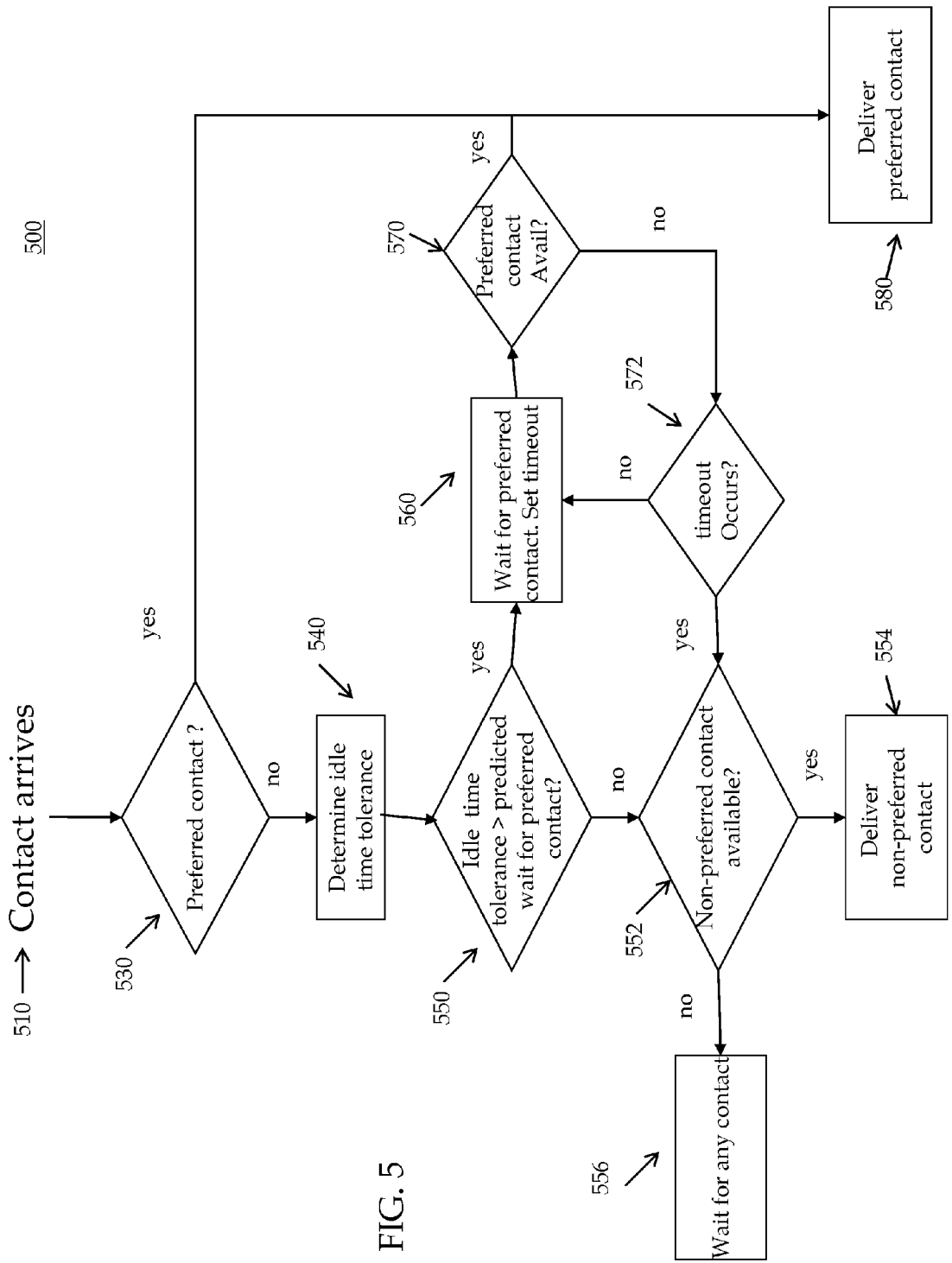
FIG. 5 is a flow chart depicting a flow for assigning a preferred customer to an agent based upon availability and within a tolerable idle time in accordance with another embodiment of the present invention.

In accordance with one embodiment of the present invention, utilizing the systems described in FIGS. 1-3, there is provided a method depicted in the flow diagram 500 of FIG. 5 for delivering contacts to preferred agents in a contact center. In this embodiment, and idle agent may wait by up to an idle time tolerance for a preferred contact to arrive.

Method 500 begins at step 510 where a contact arrives at the contact center 100. At step 530, the method queries whether any this contact is a preferred contact for an idle agent. If this contact is a preferred contact for an idle agent, then control of flow diagram 500 passes to step 580 at which the contact is delivered to the idle agent for whom the contact is a preferred contact. If this contact is not a preferred contact for an idle agent, then at step 540 the method determines the wait tolerance of the contact and the idle time tolerance of the idle agent. The wait tolerance of the contact may be found in the internal database 328 of the reporting engine 324. This is achieved by looking at average abandon time, or alternatively, using the abandon time for the queue (maybe at the 90th percentile or so). As another alternative, the system can determine wait tolerance by using the service objective for the queue. The idle time tolerance of the idle agent for a preferred contact may also be obtained from internal database 328, and it may be an administered parameter.

At step 550, the method determines if the idle time tolerance of the agent is greater than the predicted wait time by an idle agent for a preferred contact to arrive. The predicted wait by time an idle agent for a preferred contact may be determined by a known "expected wait time" module. If the answer to step 550 is affirmative, then control of method 500 transitions to step 560 at which the contact is put into a queue while the agent waits for another incoming contact which may be a preferred contact for the agent. At substantially the same time, the system sets a timeout value equal to the lesser of the wait tolerance time of the contact or the idle time tolerance of the agent. At step 570, if a preferred contact becomes available to the idle agent before the timeout occurs, then at step 580, the preferred contact is delivered to the idle agent. The incoming contact from step 510 may continue to wait until the lesser of its wait tolerance or the incoming contact becoming a preferred contact for a newly-idle agent.

Alternatively, if at step 550 the answer is negative, then at step 552 the method determines if a non-preferred contact is available to the idle agent. If so, at step 554, the non-preferred contact is delivered to the idle agent. If, on the other hand, a non-preferred contact is not available at step 552, then the idle agent is queued to wait for any incoming contact at step 556.

In another embodiment, if the set timeout occurs at step 572, then the method determines if a non-preferred contact is available at step 552. The steps then repeat as before.

One advantage of embodiments of the present invention includes the ability to expand the definition of a preferred agent and a preferred contact. That is, embodiments of the present invention provide the ability to wait for a preferred agent or preferred customer, using predictors to determine when the contact arrives whether to wait for a preferred agent and to determine when an agent becomes available whether to wait for a preferred customer. This allows for the ability to wait for a preferred agent or a preferred contact based on the predicted time for a preferred agent or contact and the wait tolerance.

While the foregoing is directed to embodiments of the present invention, other and further embodiments of the invention may be devised without departing from the basic scope thereof.

What is claimed is:

1. A method to assign a contact to one of a set of undifferentiated agents, comprising:
    describing substantially each undifferentiated agent by use of at least one agent attribute to produce a set of agent attribute values;
    describing a contact by use of at least one contact attribute to produce a set of contact attribute values;
    relating the set of agent attribute values to the set of contact attribute values to produce at least one preferred agent;
    determining an expected wait time for substantially each of the at least one preferred agent, to produce an expected wait time for a next preferred agent to become available;
    retrieving, by a processor from a computer-readable memory storage, historical information for the contact;
    determining a quantifiable wait tolerance for the contact by use of the historical information;
    if the expected wait time for the next preferred agent to become available is less than the wait tolerance, then wait to assign the contact to the at least one preferred agent; and
    if the expected wait time for the at least one preferred agent is not less than the wait tolerance, then assign the contact to an undifferentiated agent.

2. The method of claim 1, wherein the at least one agent attribute comprises at least one of: a proficiency; a preferred language; a preferred demographics; a mood; a personality trait; a preferred location; a revenue potential; a first call resolution rate; an average quality score; and an average contact satisfaction score.

3. The method of claim 1, wherein the at least one contact attribute comprises at least one of: a preferred language; a preferred demographics; a mood; a personality trait; a preferred location; a repeat contact status; a purpose for contact; and a required proficiency.

4. The method of claim 1, wherein the at least one contact attribute comprises at least one of: a revenue potential; a quality score; and a contact satisfaction score.

5. The method of claim 1, further comprising:
determining an average abandon time for the contact; and
enqueueing the contact based upon the average abandon time.

6. The method of claim 1, wherein, if the expected wait time for the at least one preferred agent is not less than the wait tolerance, then the method further comprises:
interrupting a preferred agent in auxiliary work to assign the contact to the at least one preferred agent.

7. The method of claim 1, wherein, if the expected wait time for the at least one preferred agent is not less than the wait tolerance, then the method further comprises:
multi-task assigning the contact to the at least one preferred agent.

8. The method of claim 1, wherein, if the expected wait time for the at least one preferred agent is not less than the wait tolerance, then the method further comprises:
informing the contact of the expected wait time to be assigned to the at least one preferred agent; and
permitting the contact to decide whether to wait for the at least one preferred agent or to wait for an undifferentiated agent.

9. The method of claim 1, wherein the wait tolerance for the contact is determined by a service objective.

10. A system to assign a contact to one of a set of undifferentiated agents, comprising:
a processor;
a memory coupled to the processor, the memory configured to store software that, when executed by the processor, performs the steps of:
describing substantially each undifferentiated agent by use of one or more agent attributes, to produce a set of agent attribute values;
describing a contact by use of at least one contact attribute to produce a set of contact attribute values;
relating the set of agent attribute values to the set of contact attribute values to produce one or more preferred agents;
determining an expected wait time for substantially each of the one or more preferred agents, to produce an expected wait time for a next preferred agent to become available;
determining a quantifiable wait tolerance for the contact by use of historical information;
if the expected wait time for the next preferred agent to become available is less than the wait tolerance, then wait to assign the contact to the at least one preferred agent; and
if the expected wait time for the at least one preferred agent is not less than the wait tolerance, then assign the contact to an undifferentiated agent.

11. The system of claim 10, wherein the at least one agent attribute comprises at least one of: a proficiency; a preferred language; a preferred demographics; a mood; a personality trait; a preferred location; a revenue potential; a first call resolution rate; an average quality score; and an average contact satisfaction score.

12. The system of claim 10, wherein the at least one contact attribute comprises at least one of: a preferred language; a preferred demographics; a mood; a personality trait; a preferred location; a repeat contact status; a purpose for contact; and a required proficiency.

13. The system of claim 10, wherein the at least one contact attribute comprises at least one of: a revenue potential; a quality score; and a customer satisfaction score.

14. The system of claim 10, wherein the memory is further configured to store software that, when executed by the processor, performs the steps of:
determining an average abandon time for the contact; and
enqueueing the contact based upon the average abandon time.

15. The system of claim 10, wherein the software stored in the memory, when executed by the processor, further performs the steps of:
interrupting a preferred agent in auxiliary work to assign the contact to the at least one preferred agent.

16. The system of claim 10, wherein the software stored in the memory, when executed by the processor, further performs the steps of:
informing the contact of the expected wait time to be assigned to the at least one preferred agent; and
permitting the contact to decide whether to wait for the at least one preferred agent or to wait for an undifferentiated agent.

17. A computer implemented system for delivering a contact to a preferred agent after a set wait period, comprising:
a processor coupled to a computer-readable memory;
a work assignment module configured to define what agent parameters to be used to describe a preferred agent, wherein the agent parameters comprise at least one of: a proficiency; a preferred language; a preferred location; a revenue potential; a first call resolution rate; an average quality score; and an average contact satisfaction score;
an assignment module configured to evaluate the agent parameters for agents;
a collection module configured to collect a first contact parameter from one of the contact and a routing point administration, wherein the first contact parameter comprise one or more of: a preferred language; a preferred location; a repeat contact; a purpose for contact; and a required proficiency;
a database of historical data configured to store a second contact parameter, wherein the second contact parameter comprises at least one of: a revenue potential; a quality score; and a contact satisfaction score;
a search module configured to search for a preferred agent, wherein a match between the agent parameters and at least one of the first contact parameter and the second contact parameter exceeds a predetermined threshold;
a wait-determination module configured to determine, if no preferred agents are available, an expected wait period for a preferred agent to become available;
a tolerance-determination module configured to determine a quantifiable wait tolerance for the contact by use of historical information;
a retrieval module configured to access from the computer-readable memory a statistic of abandonment times in a contact history;
a queue-maintenance module configured to determine an insertion point of the contact in a queue by use of one or more of the statistic of abandonment times and a service objective for the queue;
a wait module configured to wait in the queue for a preferred agent if the wait tolerance is greater than the expected wait period, wherein the wait module is further configured to deliver the contact to a non-preferred agent if the wait tolerance is not greater than the expected wait period.

18. The system of claim 17, wherein the software stored in the memory, when executed by the processor, further performs the steps of:
   interrupting a preferred agent to assign the contact to the at least one preferred agent.

19. The system of claim 17, wherein the software stored in the memory, when executed by the processor, further performs the steps of:
   informing the contact of the expected wait time to be assigned to the at least one preferred agent; and
   permitting the contact to decide whether to wait for the at least one preferred agent or to wait for an undifferentiated agent.

20. A method to assign a preferred contact to an agent, comprising:
   describing the agent by use of at least one agent attribute to produce a set of agent attribute values;
   describing a contact by use of at least one contact attribute to produce a set of contact attribute values;
   relating the set of agent attribute values to the set of contact attribute values to produce a match indicator;
   retrieving, by a processor from a computer-readable memory storage, a maximum idle time tolerance for the agent; and
   if the agent is idle, and if an expected idle time until the preferred customer arrives is less than or equal to the idle time tolerance for the agent, then wait for the preferred customer.

21. The method of claim 20, further comprising:
   if the agent is idle and an idle time for the agent is greater than the idle time tolerance for the agent, then assigning the contact to the agent.

22. The method of claim 21, further comprising:
   determining an expected wait time for the contact; and
   if the agent is not idle and the match indicator is above a predetermined threshold, then assigning the contact to the agent if the agent becomes idle within the expected wait time.

* * * * *